Dec. 26, 1967 R. L. HESS 3,360,631
PACKAGE ASSEMBLY
Filed April 7, 1965 2 Sheets-Sheet 1
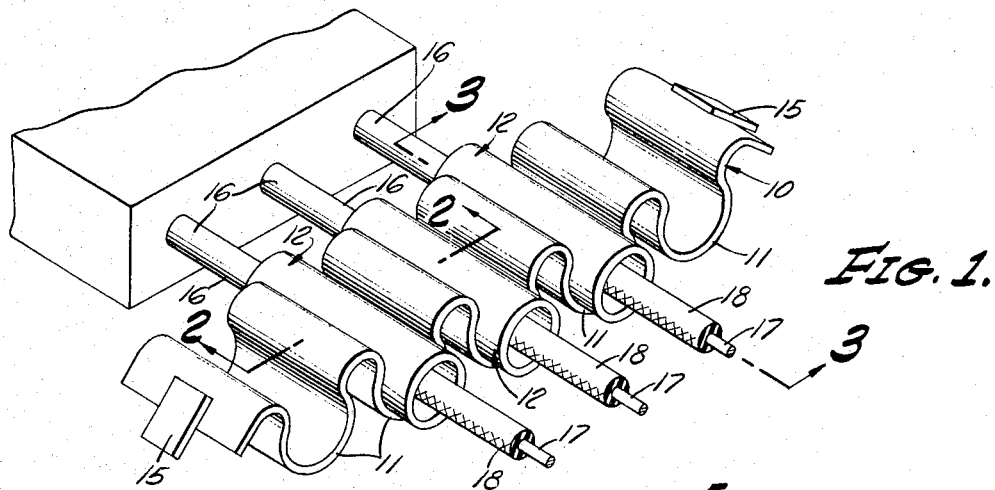
FIG. 1.
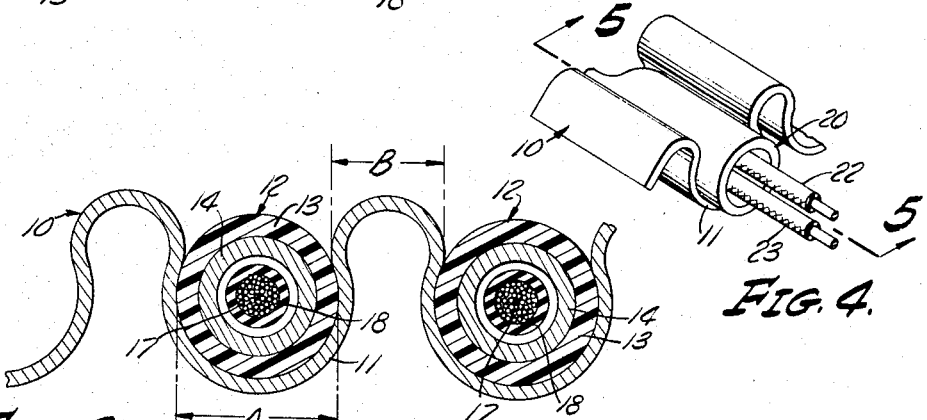
FIG. 2. FIG. 4.
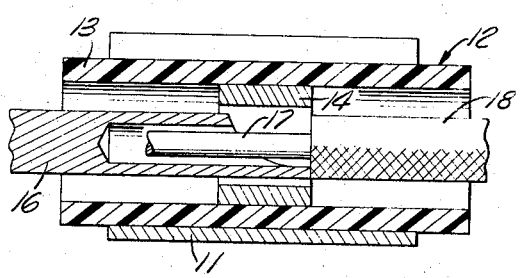 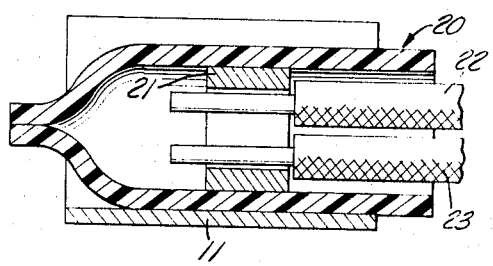
FIG. 3. FIG. 5.
ROBERT L. HESS
INVENTOR.
BY Lyon+Lyon
ATTORNEYS Dec. 26, 1967  R. L. HESS  3,360,631
PACKAGE ASSEMBLY
Filed April 7, 1965  2 Sheets-Sheet 2
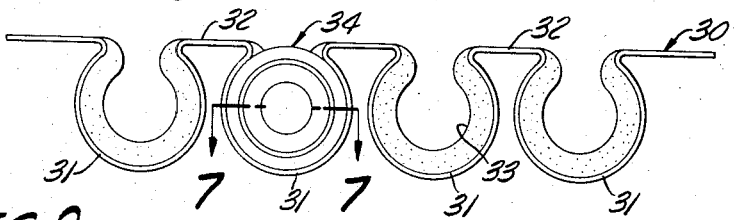
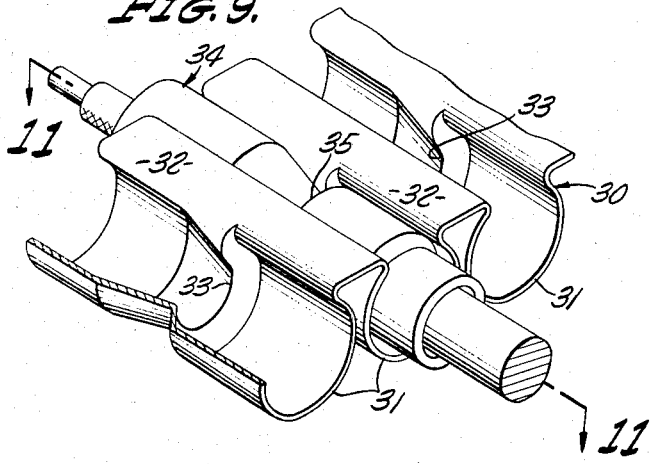
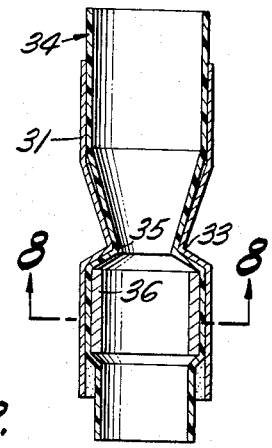
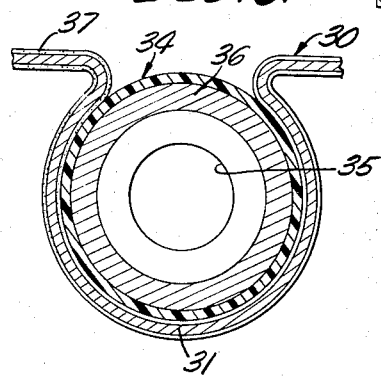
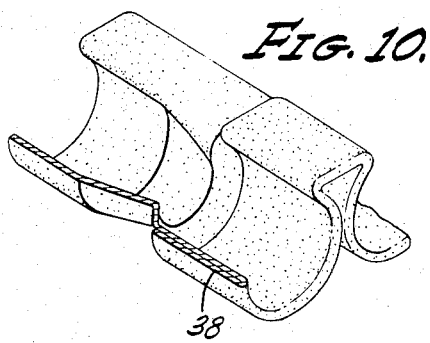
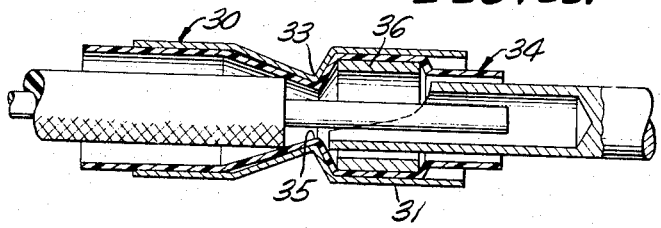
ROBERT L. HESS
INVENTOR.
BY Lyon & Lyon
ATTORNEYS

United States Patent Office 3,360,631
Patented Dec. 26, 1967

3,360,631
PACKAGE ASSEMBLY
Robert L. Hess, Palo Alto, Calif., assignor to Raychem Corporation, Redwood City, Calif., a corporation of California
Filed Apr. 7, 1965, Ser. No. 446,373
15 Claims. (Cl. 219—85)

ABSTRACT OF THE DISCLOSURE

A package and applicator for a plurality of heat recoverable members comprising a strip of electrically conducting material which is corrugated in a manner so as to receive and engage the heat recoverable members. A sufficient current passed through the strip of material will cause the members to be heated and to recover.

This invention relates to an assembly for packaging a plurality of articles and more particularly relates to an assembly for packaging and for applying simultaneously a plurality of heat recoverable sleeves.

There are many situations in which it is desirable to cover or encapsulate one or more articles with a heat recoverable sleeve. In general, such a sleeve is made of a material having plastic or elastic memory which is expanded under heat and pressure to a diameter greater than its normal diameter and then cooled while kept under pressure. A sleeve treated in this manner will retain its expanded position until it is again heated, at which time it will recover to its original shape. Examples of such heat recoverable sleeves may be found in Currie Patent 2,027,962 and Cook et al. Patent 3,086,242. Polymeric materials which have been cross-linked by chemical means or by irradiation, e.g., with high energy electrons or nuclear radiation, such as those disclosed in the Cook et al. patent, are preferred for use in the present invention.

A particular area in which recoverable sleeves of this type are extremely useful is in the making of insulated soldered connections between electrical conductors such as between a terminal on a piece of electrical apparatus and a wire, or between two wires. Generally this is accomplished by providing the recoverable sleeve with an internal ring or ball of solder, passing the electrical conductors into the two ends of the sleeve and heating this assembly so that the sleeve recovers to its original shape and the solder melts and joins the two conductors. The result is a good electrical connection which is insulated and protected by the sleeve. A preferred method of making such an electrical connection is disclosed in Wetmore application Ser. No. 211,747, filed July 23, 1962, the disclosure of which application is incorporated herein by reference. According to the teaching of that application, a fusible insert may also be provided within the recoverable member and around the solder. This fusible insert comprises a material that will flow and bond to the articles being joined, for example, insulated electrical conductors, when heat is applied so that a greatly improved level of protection is obtained. Alternatively, the solder may be omitted and the fusible insert may be used as the sole bonding material in the recoverable article.

In some cases, the conductors are inserted into the recoverable sleeve and the assembly heated by means of induction heating. While this is quite satisfactory, there are numerous electrical assemblies where a large number of connections must be made. For example, a typical cable connector is provided with a large number of contact terminals which are used to interconnect electrical circuitry. The individual forming of an electrical connection at each of these terminals is time consuming and requires a relatively high level of skills as the terminals are often quite close together. In this case, as in innumerable other cases which will be apparent to those skilled in the art, it would be highly desirable to be able to easily and quickly form all of these connections simultaneously.

It is therefore an object of the present invention to provide apparatus which can be used to simultaneously form connections between a plurality of pairs of articles such as electrical conductors and terminals.

It is also an object of the present invention to provide such an assembly which is useful for both packaging and applying a plurality of recoverable sleeves.

It is another object of the present invention to provide a packaging assembly which may also be made to serve as an electrical heater to supply the heat energy necessary to cause the recovery of sleeves of the type described and the melting of a solder insert contained therein for simultaneously making a plurality of electrical connections.

These and other objects and advantages of the present invention will become more apparent upon reference to the accompanying description and drawings in which:

FIGURE 1 is a perspective view of a first embodiment of an assembly according to the present invention;

FIGURE 2 is an enlarged sectional view taken along lines 2—2 of FIGURE 1;

FIGURE 3 is an enlarged sectional view taken along lines 3—3 of FIGURE 1;

FIGURE 4 is a perspective view of the assembly of FIGURE 1 used in connection with a recoverable sleeve of slightly different construction;

FIGURE 5 is an enlarged sectional view taken along lines 5—5 of FIGURE 4;

FIGURE 6 is an end view of a second modification of the assembly of the present invention;

FIGURE 7 is a sectional view taken along lines 7—7 of FIGURE 6;

FIGURE 8 is an enlarged sectional view taken along lines 8—8 of FIGURE 7;

FIGURE 9 is a perspective view of the assembly of FIGURE 6 with a single sleeve positioned therein;

FIGURE 10 is a perspective view of a modification of the assembly of FIGURE 9; and FIGURE 11 is a sectional view taken along lines 11—11 of FIGURE 9.

Briefly, the present invention envisions the use of a sheet of material having suitable electrical resistance characteristics and formed with a plurality of corrugations joined by bridging strips. Recoverable sleeves having solder inserts, for convenience hereinafter referrad to as solder sleeves, are positioned in the corrugations, the corrugations being preferably designed so that the solder sleeves are force-fitted therein. It should be understood, however, that any suitable means for releasably attaching the solder sleeves or similar articles to the corrugated sheet may be employed. The positioning of the solder sleeves in the corrugated package may be done at the point of manufacture or distribution of the sleeves, or may be done by the individual users as required. The completed package assembly is fitted to the part to be soldered and insulated and a suitable electrical current passed through the corrugated resistance material, causing resistance material to be heated thus causing the recovery of the heat shrinkable insulation and the fusing of the solder around the electrical conductors. Thus, a great number of electrical connectors can be simultaneously made in such a manner.

Turning now to FIGURES 1 through 3 of the drawing, a thin sheet of corrugated resistance alloy 10 has positioned in its corrugations 11 a plurality of solder sleeves 12. The inner diameter A of each of the corrugations 11 is sufficiently less than the outer diameter of the corresponding solder sleeve 12 to permit a snap-fit of the solder sleeve in the corrugation. The effective width B of the bridging strips between the corrugations 11 can be assigned any value required for proper center spacing between the solder sleeves 12. It should be understood that some deviation from the spacing of the objects with which the assembly of the present invention is to be associated may be permitted since the corrugations will be sufficiently flexible to permit proper functioning at the assembly. This will, of course, depend on the configuration of the assembly to which the electrical connections are being made.

In the embodiment illustrated in FIGURES 1 to 3, each of the solder sleeves 12 comprises a heat recoverable sleeve 13 and a solder ring 14 positioned intermediate the ends of the sleeve 13. The sleeve may be of any suitable material having plastic or elastic memory, examples of such materials being described in the aforementioned Currie and Cook et al. patents, the disclosures of which are incorporated by reference herein. The solder ring 14 is composed of solder and flux and could, of course, be replaced by any suitable solder insert, such as the ball shown in the aforementioned Wetmore application. The recoverable sleeve could also be provided with a fusible insert as disclosed in the Wetmore application if desired. Each end of the corrugated sheet 10 may be provided with a terminal tab 15 to which electrical leads can conveniently be attached.

When the assembly is to be used, it is fitted to the apparatus to be soldered and insulated. As illustrated in FIGURES 1 through 3, the apparatus could be one having a plurality of terminals or bars 16 which are to be electrically connected to a plurality of wires 17 each having a plurality of conductors and an insulating coating 18. The package assembly is fitted to the apparatus with the terminals 16 extending into one end of the sleeve 13 and the wires 17 extending into the other end. Electrical leads are then connected to the tabs 15 and a current is passed through the resulting circuit causing the sheet of resistance alloy to be heated to a temperature sufficient to melt the solder inserts 14 and recover the sleeves 13. After the sleeves 13 have recovered tightly around the terminals 16 and the insulation 18 on the wires 17 and the solder joints are made, the current is removed and the resistance alloy sheet stripped from the recovered sleeves and discarded. Generally, heating the sheet to approximately 600° F. for 20 to 30 seconds is sufficient for recovery and soldering to take place. It has been found that uniform heating in the horizontal direction is best obtained by providing one extra empty corrugation at each end of the sheet, and the assembly is therefore preferably assembled in this manner.

Turning now to FIGURES 4 and 5, a solder sleeve 20 of slightly different configuration from the solder sleeves 12 is inserted into each of the corrugations 11 in the sheet 10 of resistance alloy material. The sleeve 20 is closed at one end and is also provided with a solder insert 21. This type sleeve is extremely useful in joining two wires 22 and 23 which are inserted into the open end of the sleeve 20. The operation of the packaging assembly of FIGURES 4 and 5 is in all respects identical to that shown in FIGURES 1 through 3.

The sheet 10 may be made of any suitable resistance alloy, the particular resistance characteristics and dimensions being determined by the nature of each specific application. As an example, the resistance alloy may have a resistance on the order of 600–800 ohms per circular mil foot and have a temperature coefficient of resistivity of .001–.0038 ohms/ohm per degree C. An alloy composition that will have such characteristics is one comprising about 60% nickel and about 40% chromium. Another composition having similar characteristics comprises about 60% nickel, about 20% chromium, and about 20% iron. The thickness of the sheet 10 is preferably between .001 inch and .010 inch, the thickness being dependent upon the particular heating requirements of each application. The width of the sheet 10 should, of course, correspond generally to the length of the solder sleeve to be packaged, the width of the sheet 10 preferably being slightly less than the length of the solder sleeve.

Turning now to FIGURES 6, 7, 8, 9 and 11, a second embodiment of the assembly of the present invention is illustrated. In this embodiment, a sheet of resistance alloy 30 is provided with a plurality of corrugations 31 and bridging strips 32, the latter being bent flat to better retain the solder sleeves. Each corrugation 31 is provided with an indented shoulder 33 intermediate its ends for better retaining a solder sleeve 34 having a corresponding indentation 35. The solder sleeve 34 is made in the same manner as the solder sleeve 12 and is provided with a similar solder insert 36. As shown, this insert 36 is positioned towards one end of the sleeve; it is to be understood, however, that it and the indentation 35 could be positioned at any desired location along the length of the sleeve. The shoulder 33 could be replaced by suitable dimples if desired.

The thin metal sheet 30 is coated with a layer of Teflon 37 (shown in FIGURE 8) which serves as a heat barrier separating the solder sleeve from the metal and prevents local overheating and possible degradation of the solder sleeve. The Teflon layer may be sprayed on, laminated, or be in the form of a tape with a silicon adhesive. As illustrated, the heat barrier material covers the entire surface of the sheet 30. It is only necessary, however, that the surfaces of the corrugations in contact with the sleeves be so coated. Thicknesses from .00075 to .0035 inch have been found to be satisfactory but the thickness does not appear to be critical to the operation of the assembly. It will be obvious to those skilled in the art that materials other than Teflon can be used for this purpose.

In order to provide the necessary distribution of heat on the sleeve, it has been found desirable to provide a double thickness of the alloy at the section of the sheet which will be in the vicinity of the solder insert when the sleeves are positioned in the corrugations. This is accomplished by fastening in any suitable manner an additional strip of alloy material to the sheet 30. One manner in which this is easily achieved is shown in FIGURE 10. In this figure, the edge of the sheet has been doubled back to form an additional thickness 38. This effectively increases the amount of heat in the area of the solder insert to compensate for the heat sink of the solder insert and the connection to be soldered. If desired, the sheet 30 could be rolled or otherwise integrally formed with a greater thickness in this area. It should be understood that this additional heating feature could be employed with equal effect in the embodiment of FIGURE 1, as could the heat barrier coating.

From the foregoing description, it can be seen that a package assembly has been provided which is useful to both ship and store solder sleeves and to permit the simultaneous and trouble-free application of a plurality of such sleeves. The corrugated strips of the present invention may be cut to length as desired. While the foregoing description has primarily discussed the packaging assembly as being useful for making insulated electrical connections, it should be understood that the invention is equally useful in any situation where it is desired to simultaneously heat a plurality of heat recoverable articles. It should also be understood that while the invention has been described in connection with the joining of two articles such as electrical conductors, it is equally useful in joining more than two, or if the occasion demands it, capping or encapsulating a single article.

The invention may therefore be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A package for heat recoverable objects, comprising: a corrugated sheet of electrically conductive material, each corrugation being adapted to receive one of said objects, at least a portion of each said corrugation having a transverse dimension slightly smaller than the transverse dimension of said objects whereby said objects may be force fit into and securely held by said corrugations, and means for connecting said sheet into an electrical circuit whereby said sheet can be heated by passage of current therethrough.

2. The package of claim 1 wherein said corrugations are coated with a heat barrier material.

3. The package of claim 1 wherein said corrugations are provided with an area having a greater thickness of said material than the remainder of said corrugations.

4. A package for cylindrical heat recoverable objects comprising: a corrugated sheet of electrically conductive material, each corrugation being adapted to receive one of said objects, the diameter of said corrugations being slightly smaller than the diameter of said objects whereby said objects may be force fit into and securely held by said corrugations and means for connecting said sheet into an electrical circuit whereby said sheet can be heated by passage of current therethrough.

5. A package for heat recoverable objects each having a portion of reduced transverse dimension, comprising: a corrugated sheet of electrically conductive material, each corrugation being adapted to receive one of said objects, each of said corrugations having a portion of reduced transverse dimension corresponding to the reduced portions of said objects whereby said objects may be force fit into and securely held by said corrugations, and means for connecting said sheet into an electrical circuit whereby said sheet can be heated by passage of current therethrough.

6. A package assembly comprising: a corrugated sheet of electrically conductive material, a plurality of heat recoverable sleeves, each of said sleeves being inserted into one of said corrugations, means for attaching said sleeves to said sheet whereby said sleeves are securely held in said corrugations, and means for connecting said sheet into an electrical circuit whereby said sheet can be heated by passage of current therethrough.

7. A package assembly comprising: a corrugated sheet of electrically conductive material, a plurality of heat recoverable cylindrical sleeves, each of said sleeves being inserted into one of said corrugations, the diameter of said corrugations being slightly smaller than the diameter of said objects whereby said sleeves are securely held in said corrugations, and means for connecting said sheet into an electrical circuit whereby said sheet can be heated by passage of current therethrough.

8. A package assembly comprising: a corrugated sheet of electrically conductive material, a plurality of heat recoverable sleeves each having a portion of reduced transverse dimension, each of said sleeves being inserted into one of said corrugations, each of said corrugations having a portion of reduced transverse dimension corresponding to the reduced portions of said sleeves whereby said sleeves are securely held in said corrugations, and means for connecting said sheet into an electrical circuit whereby said sheet can be heated by passage of current therethrough.

9. A package assembly for use in simultaneously making a plurality of insulated electrical connections, comprising: a corrugated sheet of a resistance alloy, a plurality of heat recoverable sleeves, each of said sleeves having a solder insert therein, each of said sleeves being inserted into one of said corrugations, means for attaching said sleeves to said sheet whereby said sleeves are securely held in said corrugations, and means for connecting said sheet into an electrical circuit whereby said sheet can be heated by passage of current therethrough thereby causing said sleeves to recover and said solder inserts to melt.

10. The package assembly of claim 9 wherein said corrugations are provided with an area having a greater thickness of said material in the vicinity of said solder insert than the remainder of said corrugations.

11. The package assembly of claim 9 wherein the material of said sheet has a resistance on the order of 600–800 ohms per circular mil foot.

12. The package assembly of claim 11 wherein the material of said sheet comprises about 60% nickel and about 40% chromium.

13. The package assembly of claim 11 wherein the material of said sheet comprises about 60% nickel, about 20% chromium and about 20% iron.

14. A package assembly for use in simultaneously making a plurality of insulated electrical connections, comprising: a corrugated sheet of resistance alloy, a plurality of heat recoverable cylindrical sleeves, each of said sleeves having a solder insert therein, each of said sleeves being inserted into one of said corrugations, the diameter of said corrugations being slightly smaller than the diameter of said sleeves whereby said sleeves are securely held in said corrugations, and means for connecting said sheet into an electrical circuit whereby said sheet can be heated by passage of current therethrough thereby causing said sleeves to recover and said solder inserts to melt.

15. A package assembly for use in simultaneously making a plurality of insulated electrical connections, comprising: a corrugated sheet of a resistance alloy, a plurality of heat recoverable sleeves each having a portion of reduced transverse dimension, each of said sleeves having a solder insert therein, each of said sleeves being inserted into one of said corrugations, each of said corrugations having a portion of reduced transverse dimension corresponding to the reduced portions of said sleeves whereby said sleeves are securely held in said corrugations, and means for connecting said sheet into an electrical circuit whereby said sheet can be heated by passage of current therethrough thereby causing said sleeves to recover and said solder inserts to melt.

References Cited

UNITED STATES PATENTS

| | | | |
|---|---|---|---|
| 1,521,241 | 12/1924 | Hale | 219—549 X |
| 1,570,012 | 1/1926 | Simmons | 219—553 X |
| 2,902,574 | 9/1959 | Gudmundsen et al. | 219—275 |
| 3,086,187 | 4/1963 | Duggan et al. | 338—283 |
| 3,187,076 | 6/1965 | Machlan et al. | 13—6 |
| 3,239,125 | 3/1966 | Sherlock | 228—56 |
| 3,243,211 | 3/1966 | Wetmore | 174—84 X |

RICHARD M. WOOD, *Primary Examiner.*

B. A. STEIN, *Assistant Examiner.*